United States Patent
Benson et al.

(10) Patent No.: US 6,714,662 B1
(45) Date of Patent: Mar. 30, 2004

(54) METHOD AND APPARATUS FOR DETERMINING THE QUALITY OF AN IMAGE OF AN AGRICULTURAL FIELD USING A PLURALITY OF FUZZY LOGIC INPUT MEMBERSHIP FUNCTIONS

(75) Inventors: Eric R. Benson, Urbana, IL (US); Qin Zhang, Champaign, IL (US); John F. Reid, Champaign, IL (US)

(73) Assignee: Case Corporation, Racine, WI (US)

( * ) Notice: Subject to any disclaimer, the term of this patent is extended or adjusted under 35 U.S.C. 154(b) by 388 days.

(21) Appl. No.: 09/612,851

(22) Filed: Jul. 10, 2000

(51) Int. Cl.$^7$ .................................................. G06K 9/00
(52) U.S. Cl. ...................... 382/104; 382/199; 382/307; 348/113; 701/23; 701/28
(58) Field of Search ................................. 382/100, 104, 382/153, 160, 173, 181, 190, 199, 206, 307; 56/10.1, 10.2 F, 10.2 J; 348/113, 116, 119; 318/580, 587; 701/23, 28, 40, 41, 50, 57, 213

(56) References Cited

U.S. PATENT DOCUMENTS

| | | | |
|---|---|---|---|
| 5,545,960 A | * 8/1996 | Ishikawa | 318/587 |
| 5,704,200 A | * 1/1998 | Chmielewski, Jr. et al. | 56/10.2 E |
| 5,828,971 A | 10/1998 | Diekhans et al. | 701/41 |
| 5,857,539 A | 1/1999 | Diekhans et al. | 180/401 |
| 5,911,669 A | * 6/1999 | Stenz et al. | 56/10.2 F |
| 6,285,930 B1 | * 9/2001 | Dickson et al. | 701/28 |
| 6,336,051 B1 | * 1/2002 | Pangeles et al. | 700/50 |

OTHER PUBLICATIONS

Hagras, et al. "Online learning of the sensors fuzzy membership functions in autonomous mobile robots", IEEE, pp. 3233–3238, Apr. 2000.*

*Vision–Based Perception For An Automated Harvester*, Mark Ollis & Anthony Stentz Robotics Institute, Carnegie Mellon University, Pittsburgh, Pennsylvania 15213 (7 pgs).

*First Results in Vision–Based Crop Line Tracking*, Mark Ollis & Anthony Stentz Robotics Institute, Carnegie Mellon University, Pittsburgh, Pennsylvania 15213 (6 pgs).

*An Adaptive Fuzzy Crop Edge Detection Method for Machine Vision*, E.R. Benson; J.F. Reid; Q. Zhang; F.A.C. Pinto, Paper No. 00XXXX UILU–00–XXXX, An ASAE Meeting Presentation (12 pgs).

*Development of an Automated Combine Guidance System*, E.R. Benson; J.F. Reid; A. Zhang, Paper No. 00XXXX UILU 00–XXXX, An ASAE Meeting Presentation (6 pgs).

* cited by examiner

Primary Examiner—Daniel Mariam
(74) Attorney, Agent, or Firm—Rebecca I. Henkel; Brant T. Maurer

(57) ABSTRACT

A combine having a camera system is disclosed in which pictures of the ground in front of the vehicle are processed to extract the slope and intercept of a characteristic line indicative of the boundary between the cut and uncut portions of the field. A fuzzy logic algorithm compares the slope and intercept using four input membership functions and a single output membership function. If the slope and intercept extracted from the image are deemed acceptable, they are used to navigate the vehicle through the field. If they are not acceptable, the combine continues to use slope and intercept values previously deemed acceptable to guide the vehicle. This process of image data extraction and quality analysis continues repetitively as the combine traverses the field harvesting crops.

21 Claims, 7 Drawing Sheets

METHOD AND APPARATUS FOR DETERMINING THE QUALITY OF AN IMAGE OF AN AGRICULTURAL FIELD USING A PLURALITY OF FUZZY LOGIC INPUT MEMBERSHIP FUNCTIONS

CROSS-REFERENCES TO RELATED APPLICATIONS

The present application is related to "A Method and Apparatus for Processing an Image of an Agricultural Field" filed by Benson, et al. on an even date herewith.

FIELD OF THE INVENTION

This invention relates generally to processing of sensor signals. More particularly, it relates to the determination of the quality of sensor signals received from a sensor in deciding whether to use them or not to use them in the automatic control of an industrial process. Even more particularly, it relates to the determination of the quality of a camera image of an agricultural field, and whether data extracted from that image should be used to guide the vehicle through the field.

BACKGROUND OF THE INVENTION

All sensors are noisy. By noise, we mean anything that causes the sensor signal to depart from an ideal expected value. This degree of noise or error can be substantial in many sensors.

In most industrial applications, quick and dirty rules of thumb are used to determine whether a sensor is providing signals that are truly representative of the physical phenomenon being monitored. For example, an electronic thermometer being used to monitor the temperature of water boiling at atmospheric pressure and temperature, wherein the temperature is used to control the electricity provided to a heating element, might be configured to reject the signal from the temperature transducer if it exceeds 240° F. The underlying assumption is that the transducer is in water and the water is boiling at atmospheric temperature and pressure. Therefore, a temperature of 240° F. would indicate an impossible state of events. At standard atmospheric pressure, water should never rise above 212° F. It would be appropriate to hard limit a temperature sensor to a temperature slightly above 212° F., since such a temperature reading from the sensor would clearly be an error.

Sensor readings, however, and the systems in which they are employed, are often not so easily handled. For example, using the above situation, if the water was being heated in a pressure vessel, it is quite possible that a temperature of 240° F. could properly indicate the temperature of boiling water. The likelihood that a temperature of 240° F. was incorrect would vary, depending upon the pressure of the pressure vessel in which the water was being boiled. The larger the pressure, the more likely that a temperature of 240° F. was still acceptable for use in the temperature feedback control system.

The determination of the acceptability, or the unacceptability of a signal, i.e. the likelihood that the signal accurately represents a true physical phenomenon, may therefore depend on many different machine or process perameters, most significantly including any change or difference from a preceding measurement of the sensor signal. What do we mean by this? Imagine that in the example above, the heating element, heating the water to a boiling point is only capable of raising the temperature by 5° F. per minute. If the temperature sensor indicated that the temperature of the water increased by 5° in one second, this radical and sudden change (e.g., if changed from 180° F. to 185° F.), would indicate that the sensor signal was incorrect.

Thus, to provide more accurate control of an automated system, especially in systems where there is a significant amount of noise, it would be beneficial to determine whether a particular sensor reading or a particular signal value, acceptably represented the underlying measured physical phenomenon by taking into account a plurality of different factors, and possibly different measurements, that are not limited to fixed limits.

One class of applications are particularly well suited to this technique, in particular, machine vision systems for guidance or control used in agricultural or construction applications. In recent years, construction and agricultural vehicles, either tracked or wheeled, have been equipped with camera systems that attempt to extract information indicative or characteristic of the surrounding environment from a series of images taken by a camera that is typically fixed to the vehicle. We normally think of computers in the current day as being extremely fast. This is not so in the case of image processing, especially image processing in chaotic visual environments with a great deal of random colors, intensity, and shapes. Such environments include, agricultural applications in which the camera is directed towards the ground where the crops adjacent to the vehicle, and construction environments in which the camera is directed to churned-up earth in the areas adjacent to the vehicle. In both these situations, the shear randomness of much of the image requires extensive processing to extract a signal that can be used to control operation of the vehicle. Any control algorithm that extracts characteristics of the environment from the image itself will inevitably have a huge component of noise. Yet, since the information extracted from this sequence of images is typically used for real time control of the vehicle, it is essential that this image processing happen extremely fast, on the order of several times a second. Inevitably, this means that any extraction of characteristics of the image and hence of the surrounding scene must happen extremely fast and must be (at least at the current time) relatively crude and noisy.

One specific vehicular application in which the characteristics extracted from the image may be noisy is that described in the patent application entitled "A Method and Apparatus for Processing an Image of an Agricultural Field", filed contemporaneously herewith. That application is incorporated by reference in its entirety herein for any purpose.

In that application, a series of images are taken by a camera mounted on the harvesting head of a combine. This camera is pointed directly ahead of the vehicle in the direction that the harvesting head travels as it harvests crops. The camera is aligned such that it travels through the field substantially on top of the boundary between the previously cut and uncut regions of the field. In other words, one side of the image shows the portion of the field with the uncut crop and the other side of the image shows the portion of the field with the harvested crop.

FIG. 3 is a typical image taken by a camera in accordance with this invention showing the boundary between the cut and uncut regions extending as a line from the lower left corner of the image frame to the upper central portion of the image frame. This line is approximated in FIG. 4 as described in the above-identified specification.

As each image from this camera is processed, the central processing unit extracts two characteristics of the scene from each image: a numeric value indicative of the boundary line and a numeric value indicative of the intercept of the line. Thus, image processing extracts two numeric values that collectively define a line extracted from the camera image and representative of the physical boundary between the cut and uncut portions of the field. For example, the preferred harvest crop is corn which is planted in rows. The header travels down these rows in which these lines also correspond to the row of planted crop.

Given the rather precise boundary shown in FIG. 3, one might expect that it would be relatively easy to extract the boundary line, the row line from images of like quality. That is true. Unfortunately, in real life, there are a variety of factors, such as variations in leaf growth, insects, dirt, fog, and dust, as well as the curvature of the boundary line in the field that cause the slope and intercept to vary, sometimes considerably, from image frame to successive image frame. For example, FIG. 5 shows an image in which a corn leaf was flashing in front of the camera at the instant the camera took its picture. Superimposed on top of the image is the characteristic boundary line that would have been extracted from this image. As can be seen, the slope and intercept of this line varies considerably from the slope and intercept of an "uncontaminated" image such as that of FIGS. 2 and 3. If the vehicle guidance systems actually received the slope and intercept from FIG. 4 and attempted to change the direction of the vehicle based on the resulting calculated position error, the combine would suddenly and unexpectedly turn to the right, away from the boundary line, in an attempt to "move" the boundary line closer to that represented in FIGS. 3 and 4. In short, the vehicle's guidance system would believe that the vehicle was off course.

Erroneous calculations and hence erroneous numeric values can be expected in agricultural and construction applications such as those described herein. The problem is not easy to solve in this instance for a couple reasons. There is nothing inherent in the erroneous slope and intercept of FIG. 4. Indeed, the combine might well be traveling in a very off-course manner such as that suggested by the erroneous characteristic line shown in FIG. 4 and therefore need to be moved into the proper position. Yet, at the same time, we do know that the farther the slope and intercept are from that shown in FIGS. 2 and 3, the less likely it is that they truly represent the boundary line between the cut and uncut portion of the field. At the same time, if the slope and intercept of FIG. 4 came about because of a gradual drift in the vehicle (i.e., a gradual change in slope and intercept over time), it is more likely that they do represent a true slope and intercept of the boundary line. When a corn stalk or other item flashes across in front of the camera, there will be a sudden and pronounced change in the slope and intercept as compared to one or more previous slopes and intercepts taken from image frames previously processed.

Any method of determining whether a particular signal (e.g., a particular slope and intercept) truly represents the boundary line of the cut and uncut portions of the field will therefore depend not only on the distance from a presumed perfect slope and intercept (i.e. the slope and intercept that would exist when the vehicle is tracking perfectly through the field harvesting crop), but also the rate of change of the slope and intercept as compared to previously measured slopes and intercepts. Accommodating these two changing probabilities is difficult when fixed acceptance/rejection limits are applied. What is needed is a method for quantifying the acceptability/unacceptability of the sensor signals based upon a plurality of different measurements to determine whether or not a particular sensor signal (e.g., slope and intercept) are acceptable for use in vehicle control or guidance. It is an object of this invention to provide such a system.

SUMMARY OF THE INVENTION

In accordance with the first embodiment of the invention, a method of processing a sensor signal indicative of an environmental condition includes the steps of receiving an electrical sensor signal indicative of an environmental condition, deriving from the sensor signal at least one numeric sensor signal value characteristic of an environmental condition, processing the sensor signal with a plurality of fuzzy logic input membership functions, combining the outputs of the plurality of fuzzy logic membership functions in at least one fuzzy logic output membership function, and defuzzifying the output of the at least one output membership function to determine whether or not the signal is acceptable or not.

The sensor signal may be a plurality of numeric values indicative of an electronic camera image.

The at least one numeric sensor value may be indicative of the boundary between a cut portion and an uncut portion of an agricultural field, and further, the step of deriving may include the step of analyzing the camera image to reduce the plurality of numeric values to the at least one numeric sensor signal value.

The step of processing the sensor signal may include the steps of processing a first of the plurality of numeric sensor values with a first of the plurality of fuzzy logic input membership functions, wherein the first input membership function may be indicative of the acceptability/unacceptability of the first numeric sensor value, processing a second of the plurality of numeric sensor values with the second of the plurality of fuzzy logic membership functions, wherein the second input membership function may be indicative of the acceptability/unacceptability of the second numeric sensor value.

The step of combining the outputs may include the step of combining the outputs of the first and second membership functions in at least one fuzzy logic output membership function.

The first numeric sensor value may be derived from a first electronic image.

The second numeric sensor value may be derived from the first electronic image.

In accordance with the second embodiment of the invention, a method of processing a sequence of electronic camera images using fuzzy logic is provided including the steps of taking a first electronic camera image indicative of a scene including cut and uncut vegetation in an agricultural field by an electronic camera, deriving from the first image a first numeric value indicative of a first characteristic of the first image, processing the first numeric value with at least a first fuzzy logic input membership function to provide a first numeric input value, combining the first numeric input value with at least a first fuzzy logic output membership function to provide a first numeric output value, defuzzifying the first numeric output value to determine whether or not the first numeric value properly characterizes the first image or not and saving the first numeric value.

The method may further include the steps of deriving from the first image a second numeric value indicative of a second characteristic of the first image, and processing the second numeric value with at least a second fuzzy logic input membership function to provide a second numeric input value.

The first and second characteristics may both be indicative of a boundary line defined between a cut and an uncut region of the field.

The first and second characteristics may be indicative of a row of uncut crop.

The first and second characteristics may define a line substantially parallel to a row of uncut crop.

The step of combining may include the step of combining first numeric input value and the second numeric input value with the at least a first fuzzy logic output membership function to provide the first numeric output value.

The step of defuzzifying the first numeric input value may include the step of determining that the first numeric value is acceptable, the method may further include the steps of modifying the first fuzzy logic input membership function with the acceptable first numeric input value, taking a second electronic camera image indicative of a scene including cut and uncut vegetation in an agricultural field by an electronic camera, deriving from the second image a second numeric value indicative of the first characteristic of the first image, processing the second numeric value with the previously modified at least a first fuzzy logic input membership function to provide a second numeric input value, combining the second numeric input value with the at least a first fuzzy logic output membership function to provide a second numeric output value, and defuzzifying the second numeric output value to determine whether or not the second numeric value properly characterizes the first image or not.

The step of modifying the first fuzzy logic input membership function may further include the step of changing the x-axis of the membership function based upon the value of the acceptable first numeric output value.

The step of modifying the first fuzzy logic input function may include the step of combining the first numeric output value and the second numeric output value to provide a third numeric output value indicative of the difference between the first and second numeric output values.

In accordance with a third embodiment of the invention, a work vehicle includes a ground engaging implement having a camera for taking electronic pictures of a portion of ground and/or vegetation in front of the vehicle, and a guidance control system responsive to successive images generated by the camera and implements, a method for determining whether each of the successive images transmitted by the camera to the guidance system should be used to guide the vehicle, wherein the method includes the steps of taking a picture of the ground in front of the vehicle with the camera, processing the picture to provide a first numerical value indicative of a characteristic of the ground and/or vegetation in front of the vehicle with the guidance system, wherein the numerical value may be indicative of a line of travel of the vehicle, determining whether or not the first numerical value is acceptable using at least two fuzzy logic input functions, combining the results of the at least two fuzzy logic input functions as inputs to a fuzzy logic output function, and based upon a numerical result generated by the fuzzy logic output function, determining whether the first numerical value should be used to guide the vehicle.

A first of the at least two fuzzy logic input functions may vary in its output both when a previously calculated first numerical value changes and when the first numerical value changes.

The previously calculated first numerical value was calculated by taking a previous picture of the ground in front of the vehicle with the camera and processing the previous picture to provide the previously acceptable numerical value indicative of a characteristic of the ground and/or vegetation in front of the vehicle with the guidance system, wherein the previously acceptable numerical value may be indicative of a line of travel of the vehicle, determining whether or not the first numerical value may be acceptable using the at least two fuzzy logic input functions, combining the results of the at least two fuzzy logic input functions as inputs to a fuzzy logic output function, and determining that the previously calculated first numerical value should be used to guide the vehicle, based upon a numerical result generated by the fuzzy logic output function.

An output of a second of the at least two fuzzy logic input functions may vary when the first numerical value changes.

A fourth embodiment of the invention which may further include the steps of processing the picture to provide a second numerical value indicative of a characteristic of the ground and/or vegetation in front of the vehicle with the guidance system, wherein the second numerical value may be indicative of a line of travel of the vehicle and determining whether or not the second numerical value may be acceptable using the at least two fuzzy logic input functions.

BRIEF DESCRIPTION OF THE DRAWINGS

Preferred exemplary embodiments of the present invention are illustrated in the accompanying drawings in which like reference numerals represent like parts throughout, and in which.

DETAILED DESCRIPTION OF THE PREFERRED EMBODIMENTS

Figure 1:
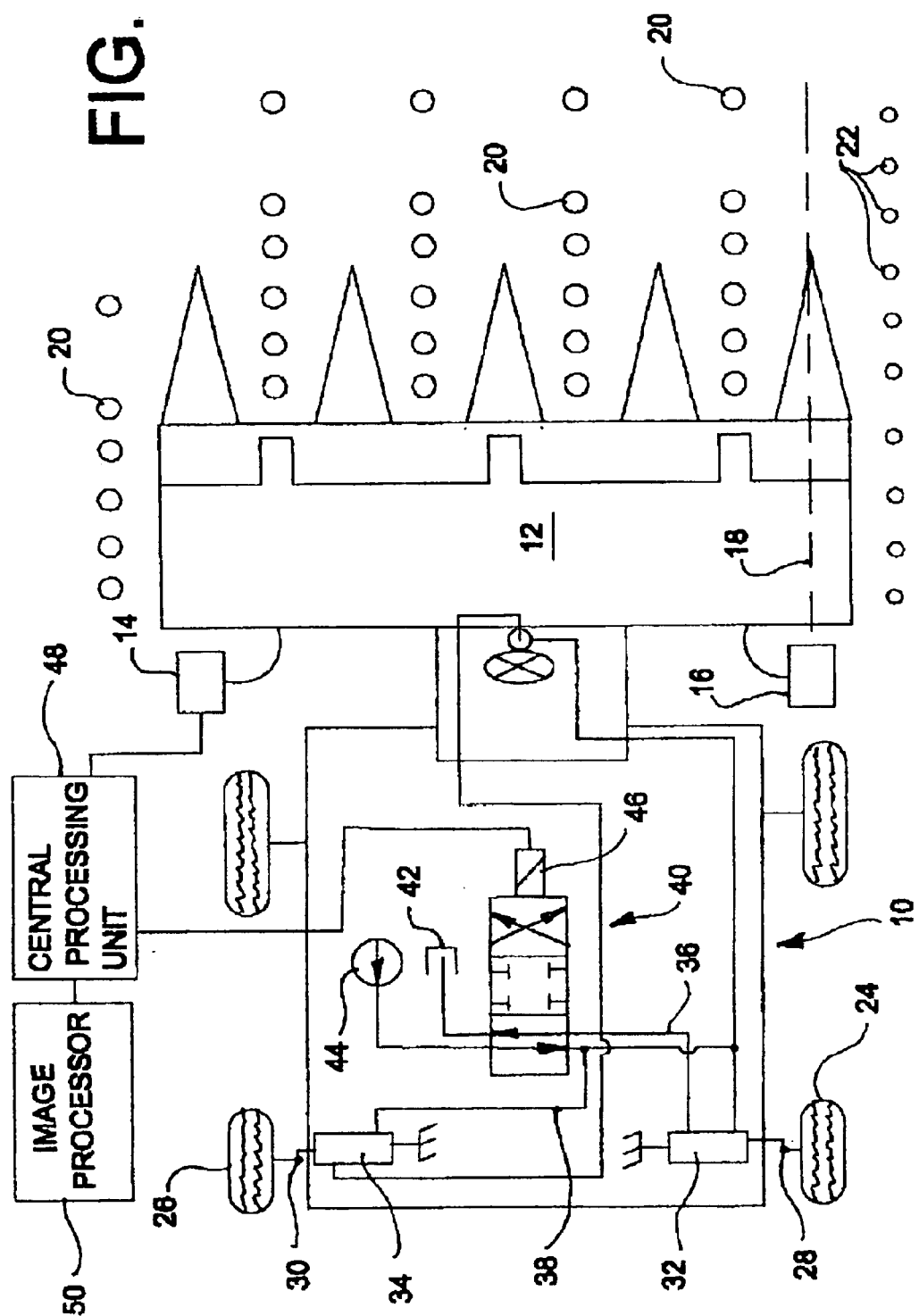
FIG. 1 is a plan view of an agricultural combine showing its header with cameras mounted proximate to each end, a control circuit for monitoring the cameras, and various guidance components for steering the vehicle through the field during harvest.

FIG. 1 is a plan view of a combine 10 having a harvesting head 12, here shown as a corn head, for harvesting a crop. Two cameras 14 and 16 are disposed at opposite sides of the combine preferably on the corn head 12 such that they point forwards and are horizontally aligned with boundary 18 between the cut and uncut regions of the field. The small circles 20 indicate corn plants (uncut crops) and the small dots 22 indicate stalks of already cut corn plants. With two cameras, the vehicle can harvest a crop with both its left side and right side adjacent to the cut/uncut boundary of the field.

Figure 2:
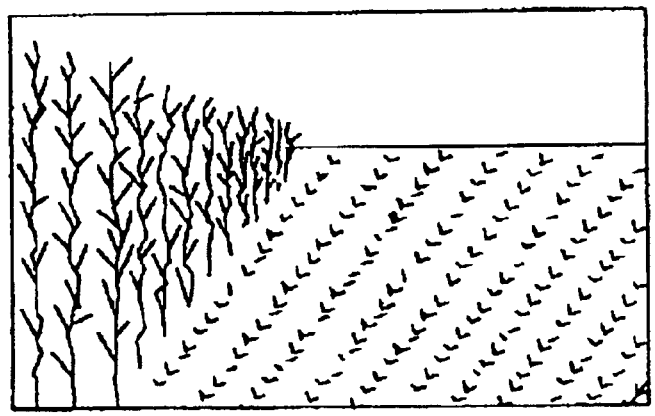
FIG. 2 represents a typical image of the field in front of the combine of FIG. 1 as it travels down the field along the cut/uncut boundary of the field harvesting a crop, here shown as corn.
Figure 3:
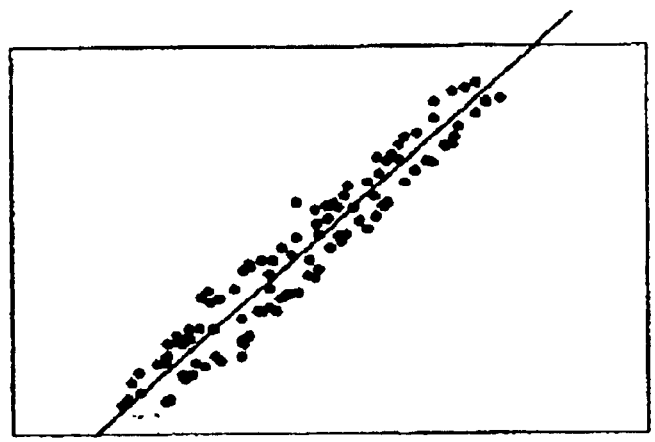
FIG. 3 illustrates the characteristic points on each scan line indicative of the boundary between the cut and uncut regions of the field extracted from the samepl image of FIG. 2.
Figure 4:
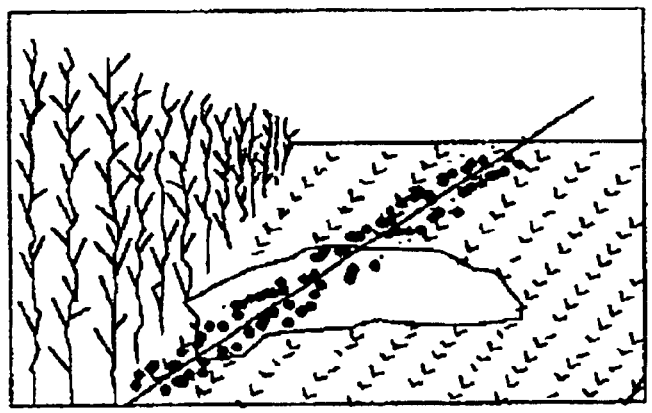
FIG. 4 represents a sample erroneous camera image of the field showing the field and also a stray corn leaf appearing in front of the camera just as the picture is taken, wherein the scattered dots and straight line indicate the characteristic points and the characteristic line, respectively, that would be extracted from this invalid image.

The combine can reverse direction in the headlands of a field. When this occurs, the camera used for gathering images will be changed from camera 16 (the one used in the FIG. 1 embodiment to take the picture shown in FIG. 2) and camera 14. Camera 14 would be used when the combine follows the same path, but in the opposite direction along the cut/uncut boundary.

Two rear wheels 24, 26 pivot about pivot points 28, 30 to steer the combine. Hydraulic cylinders 32, 34 are coupled between the chassis of the combine and the rear wheels to steer them to the left and right. Cylinders 32 and 34 are filled or evacuated through hydraulic lines 36, 38, respectively. These lines are coupled to proportional control valve 40, which in turn is coupled to hydraulic tank 42 and hydraulic pump 44.

Proportional control valve 40 is driven by electrical solenoid 46 which is coupled to and controlled by central processing unit 48. Central processing unit 48 determines the magnitude of the signal applied to proportional control valve 40, and hence the direction that the combine is steered. This calculation is based upon an analysis of the images received from the cameras. A manual hydraulic pump 100 is coupled parallel to valve 40. It is driven by combine steering wheel 102.

The central processing unit together with the image processor extract a slope and an intercept from each of the sequential images transmitted by the camera that travels along the cut/uncut boundary line. Image processor 50 receives and processes the images transmitted by cameras 14 and 16. Central processing unit 48 determines the appropriate direction that the wheels should be turned and generates the command signal that is applied to the proportional control valve 40 to steer the combine.

Figure 5:
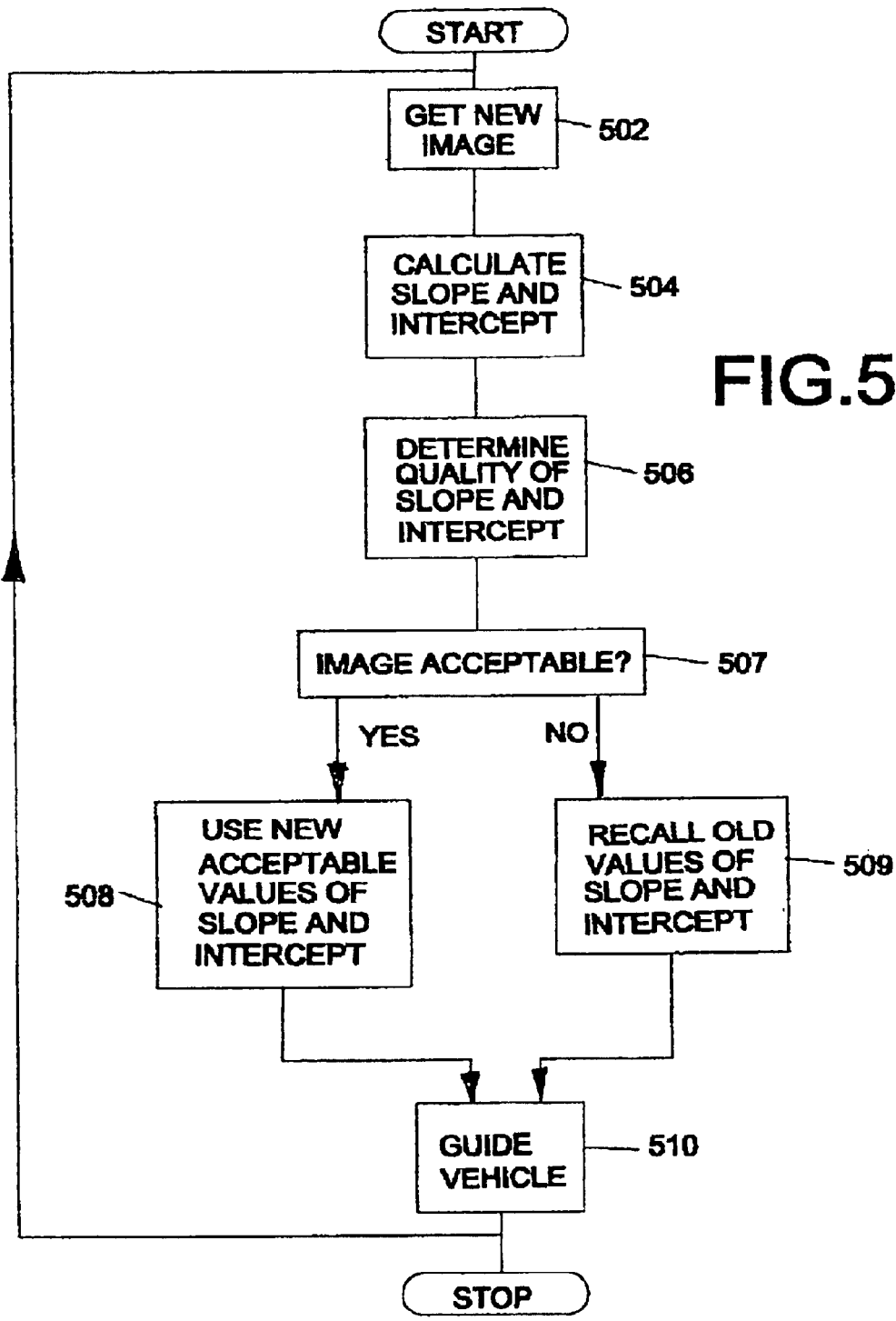
FIG. 5 is a flow chart of the processing performed by the control circuitry of the combine to retrieve the image, process it, extract the characteristics of the scene shown in the image, determine whether they are good, and apply them (if good) to the guidance system to steer the combine toward the proper path.

FIG. 5 is a flow chart of the steps performed by the control circuitry (the image processor and the central processing unit) to gather and process the image, determine the quality of the signal derived from them, and steer the combine in the right direction to keep it on course. While this FIGURE indicates the control algorithm during harvesting, the combine must be maneuvered close to the cut edge of the field before it can be engaged.

The farmer, using the steering wheel, manually guides the combine until the longitudinal axis (the axis of the vehicle parallel to the direction of travel when the vehicle is going in a straight line) is substantially parallel with the boundary between the cut/uncut regions of the field. The vehicle is also positioned such that the row of uncut crop closest to the cut/uncut boundary is harvested by a lateral end portion of the header and the vehicle is aligned such that the camera points down along the boundary line. This is the position shown in FIG. 1. Once the combine is in this position, the guidance system is engaged and the algorithm of FIG. 5 begins executing.

Referring to FIG. 5, in step 500 the system first gathers an image from the camera proximate to the cut/uncut boundary of the field (step 502). As the control circuitry fetches each image from the camera, the image processor extracts the slope and intercept of the cut/uncut boundary line from the image (step 504).

The steps of fetching the image and calculating the slope and intercept are described in more detail in the co-pending application identified.

Once the slope and intercept of the characteristic line are calculated, the central processing unit then determines the quality of those signal values (step 506). This step is explained in greater detail in accordance with FIG. 6, below.

If the slope and intercept are valid and acceptable (step 507), the system then recalculates the appropriate control signal to be applied to the proportional control valve 40 based upon the new slope and intercept signal values (step 508) and applies that revised signal to the proportional control valve (step 510). By changing the signal provided to the proportional control valve, fluid is redirected into the hydraulic steering cylinders (FIG. 2) and the vehicle is steered in a new direction.

The logic for navigating the vehicle using the slope/point values is relatively simple. A perfectly vertical cut/uncut boundary line (i.e. a slope approaching infinity) indicates that the camera is located directly over the cut/uncut boundary. With the camera mounted on the header as shown in FIG. 1, this is the preferred position for harvesting. With a perfectly vertical line, the intercept should be approximately in the middle of the image frame if the camera is pointed straight ahead of the vehicle. If the intercept is off to the left side of the image, the vehicle is turned toward the intercept line. If the intercept is off to the right of the image, the combine is turned toward the right. As the combine moves away from the proper line of travel, the slope of the cut/uncut boundary increases. For example, if the combine is a hundred feet away from the cut/uncut boundary and is facing the boundary, it will appear as a flat straight line extending from left-to-right across the image, and the x-axis intercept will approach infinity. This is equivalent to a slope of zero and an infinite absolute intercept value. The particular algorithm employed depends upon the camera selected, the size of the lens, the direction the camera is pointed, and the height of the camera above the ground.

Finally, if the slope and intercept of the image are not deemed to be valid and acceptable (step 507), they are ignored. They are not used to navigate the vehicle, and the previous historical values of slope and intercept are used instead (steps 509–510).

The process of FIG. 5 is repeated ad infinitum until the combine reaches the end of the row and must turn around. In the headlands of a typical cornfield, there are no cut and uncut boundaries. The vehicle is steered in a semi-circular path until it faces the cut/uncut boundary from the opposite direction, at which point the farmer turns the steering wheel to return along the original path from the opposite direction. Once the combine is properly aligned, the control circuitry is again engaged, and takes over control of the steering cylinders 32 and 34.

Since the combine's direction has been reversed, the other side of the header is aligned with the cut/uncut boundary, and the other camera is used to fetch images of the field. This can happen automatically, for example by calculating a characteristic line from both cameras and then seeing which one is acceptable. The one that is deemed a better fit is then used as the controlling camera. It is relatively easy to distinguish between the two images. The system will be unable to extract a characteristic line from an image of the camera that is not aligned with the cut/uncut boundary.

In some applications, the combine will harvest an entire field without reversing direction in a headland. For example, large wheat fields are harvested in a long spiral path. As the wheat is cut, the vehicle travels along a tighter and tighter spiral around the periphery of the field turning gradually, yet keeping the same side of the header aligned along the cut/uncut boundary. In situations such as this, the system may be engaged to guide the vehicle almost continually until the entire field is completely harvested.

When the guidance system is disengaged in the headland turning zones of a field, all fluid communication between the pump 44 and the tank 42 through the proportional control valve 40 is blocked. The only way fluid can be communicated to the hydraulic cylinders when the guidance system is disengaged is by manually steering the vehicle using manual pump 100 which is coupled to and driven by the steering wheel 102 of the combine in a conventional manner.

Figure 6:
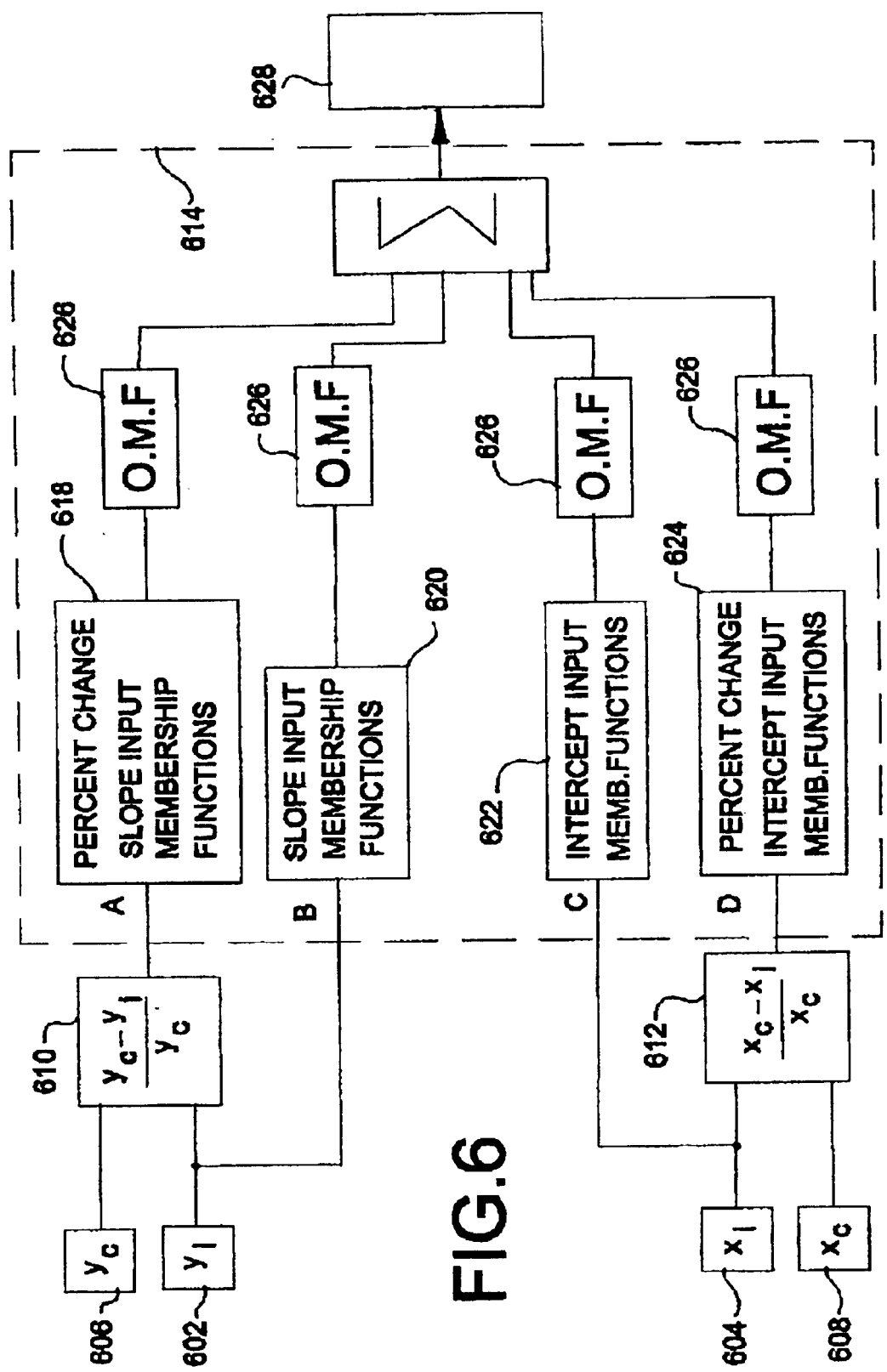
FIG. 6 illustrates the details of the fuzzy logic algorithm implemented by the control circuitry to analyze the characteristic slope and intercept of each image in turn and to determine whether the slope and intercept are valid/acceptable to be used for guiding the vehicle.

Details of the fuzzy logic quality analysis performed in step 506 are shown in FIG. 6. The quality analysis is performed on characteristics of a field that are extracted from the cameras of FIG. 1, namely the slope and intercept of the characteristic line. The analysis is just as applicable, however, to any sensor signal gathered from any sensor. For that reason, we refer to the slope and intercept being evaluated interchangeably as "sensor signals" or "signals" in the discussion below.

The signals extracted from the current image are the slope and intercept of the cut/uncut boundary in the field. These signal values are indicated as "$y_i$" (the slope that is being evaluated), and "$x_i$" (the intercept that is being evaluated) in FIG. 6 and are shown in blocks 602 and 604, respectively.

Historical signal values indicative of a previously processed image are also used in determining the quality of the current signal values in the preferred embodiment. These historical signal values are indicated in FIG. 6 as "$x_c$" (the historical intercept value) and "$y_c$" (the historical slope).

When there is an extreme change in signal values from measurement to measurement (e.g. in this case from image to image) it is likely that the current signal value being evaluated is invalid and therefore unacceptable. In order to determine whether or not there has been an extreme change in signal values over time, previous signal values, or an anticipated sensor value based upon the previous values must be compared with the current signal values being evaluated.

In the present system, the data indicative of previously acceptable signals are a previously acceptable slope, "$y_c$," and a previously acceptable intercept, "$x_c$". As shown in FIG. 5, the image processing is iterative, performed successively on a series of images received from camera as the vehicle travels down the field. As a part of this process, the signal values "$y_c$" and "$x_c$" were calculated, qualified and deemed acceptable. These prior calculated acceptable sensor values from a previous image are used in FIG. 6 as the $y_c$ and $x_c$ values of blocks 606 and 605, respectively. As each new slope and intercept are deemed to be acceptable, they become the new "$y_c$" and "$x_c$" for the next slope and intercept being evaluated. In otherwords, at the end of the quality evaluation illustrated in FIG. 6, if y and x are deemed to be acceptable they will be saved and will become the $y_c$ and $x_c$, used when the next image is processed according to FIG. 6.

In the embodiment of FIG. 6, it is the previous signal levels $y_c$ and $x_c$ that are compared with the current signal values $y_i$ and $x_i$; Nonetheless, it should be recognized that there are other ways of incorporating the historicity of the signals, the slope and intercept, into the a quality analysis. For example, rather than using a single prior acceptable sensor signal, value, an average of the last few acceptable signal values can be used. Alternatively, a time series of several of the previously acceptable signal values can be used.

The historical acceptable signal values $y_c$ and $x_c$ are combined in blocks 610 and 612 with the current signal values $y_i$ and $x_i$ in order to determine the degree of variation or difference between them. As the variation or difference between the slopes and the intercepts increases, it is more likely that the current signal values are invalid and therefore unacceptable. The slope and intercept should change relatively slowly as the combine turns. A sudden change is indicative of an erroneous signal value.

In block 610, the central processing unit calculates the percent change in the slope signal value and in block 612, it calculates the percent change in the intercept signal value.

While this is the preferred method of determining the variation or difference between the historical and current slope and intercept signal values, there are several other ways to provide a value indicative of the amount of difference. For example, the absolute difference between the signal values (e.g. $y_c-y_i$ and $x_c-x_i$) could be used.

Once calculated, the difference signals and the raw slope and intercept signals, are used as inputs "A", "B", "C", and "D" to the fuzzy logic quality analysis module 614 shown in FIG. 6. The first two of these signals, A and B, are derived from sensor signal $y_i$. "A" represents the change or difference between current signal $y_i$ and historically acceptable signal $y_c$. "B" represents the signal $y_i$ itself. Similarly, values C and D are derived from another sensor signal: $x_i$. "C" represents the signal $x_i$ itself, and "D" represents the change or difference between signal $x_i$ and previously calculated historically acceptable signal value $x_c$.

These four values, A, B, C and D, are used as inputs to fuzzy logic quality analysis module 614. Module 614 includes, in its preferred embodiment, several input membership function modules that are used to calculate a factor indicative of the acceptability of signal A (slope $y_i$) that is being evaluated and the historical signal B (slope $y_c$). The greater the current signal varies from the historical signal value, the greater the likelihood that the current signal is invalid.

Figure 9:
FIG. 9 details the operation of the percent change in slope input membership functions.

The first of these modules is module 618, the percent change in slope input membership functions. Regarding the input membership functions of module 618, and as shown in more detail in FIG. 9, we can see that as long as a change in slope from image to image is less than 20 percent, $y_i$ will be a 100 percent member of the "Good" set. As the percent change in slope moves toward 45 percent from 20 percent, signal $y_i$ becomes increasingly a member of the "Bad" set and less a member of the "Good" set.

Finally, as a percent change in slope moves from 45 to 60 percent, signal $y_i$ becomes increasingly a member of the "Really Bad" set and less a member of the "Bad" set.

The outputs of each the input membership functions of module 616 are defuzzified preferably by using the center-of-gravity technique. The output of the percent change slope input membership function will therefore change if either the historical signal value or values ($y_c$) or the current signal value ($y_i$) change. The historical signal value, $y_c$, can therefore be considered in one sense to modify the operation of the percent change slope input membership functions.

We cannot know, from given signal value, $y_i$, what the output of the percent change slope input membership functions will be. The function is dependent upon historical value $y_c$ as well as $y_i$.

Figure 7:
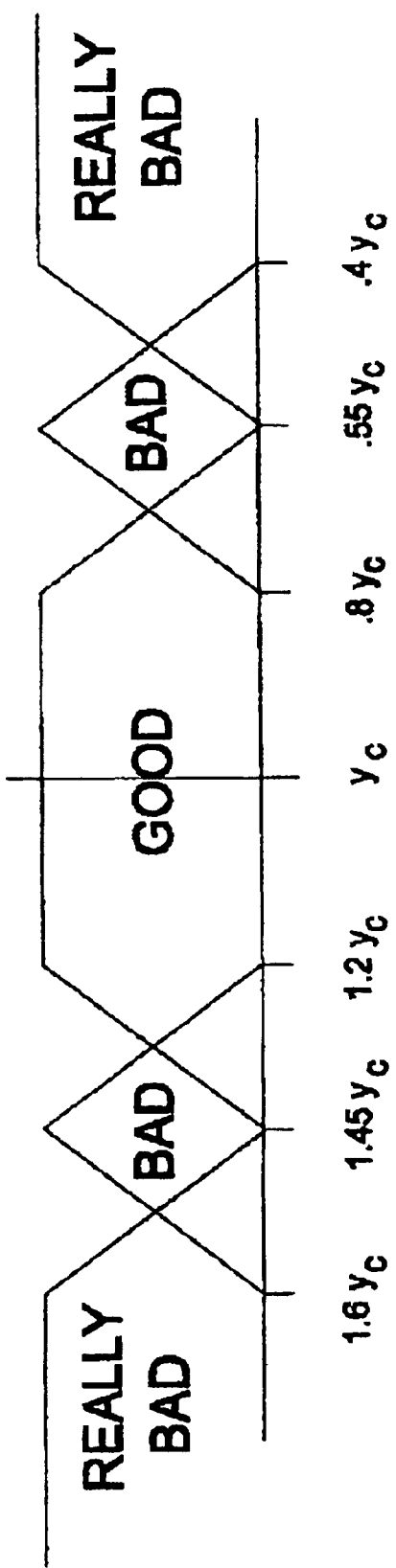
FIG. 7 illustrates an alternative fuzzy logic slope input membership function that adapts to changes in previously acceptable signal values.
Figure 8:
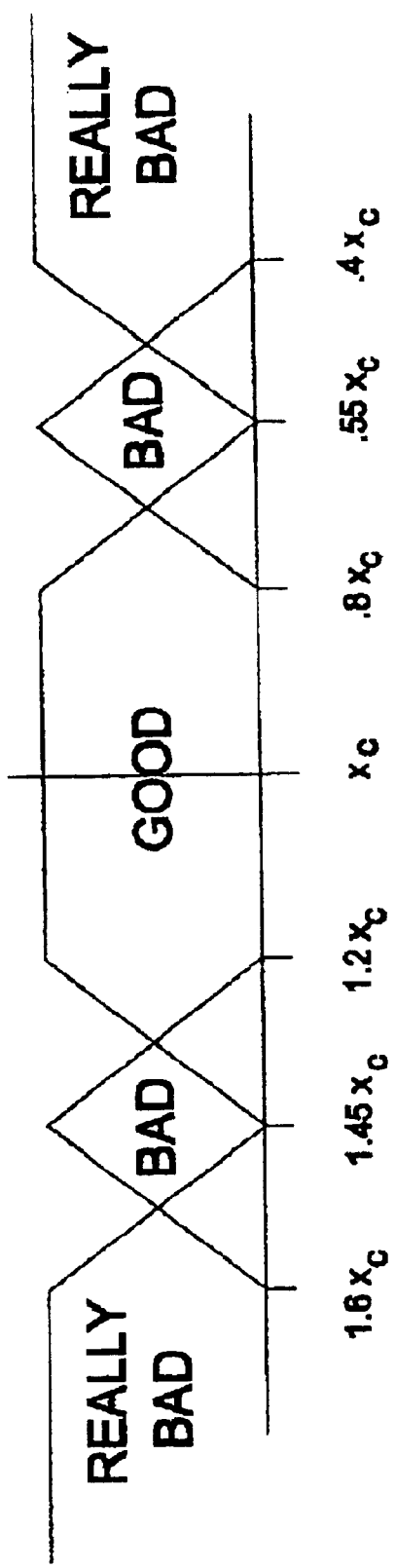
FIG. 8 illustrates an alternative fuzzy logic intercept membership function that adapts to changes in previously acceptable intercept values.

Instead of providing a percent change slope input membership functions that varies with a previously accepted slope, $y_c$, a different membership function that takes $y_i$ as an input and has an x-axis defined as a function of $y_c$ would also provide substantially the same benefit This alternative function would replace block 610 and could have been modified directly, as shown in FIG. 7 by making the x-axis dependent on the value of $y_c$ or another time-varying estimate of the slope. As shown in FIG. 7, the x-axis of the membership function is based upon a previously acceptable slope $y_c$. FIG. 8 shows similar alternative intercept input membership functions that receive $x_i$ as an input, and wherein the x-axis of the function is calculated based on the changing value of $x_c$.

Figure 10:
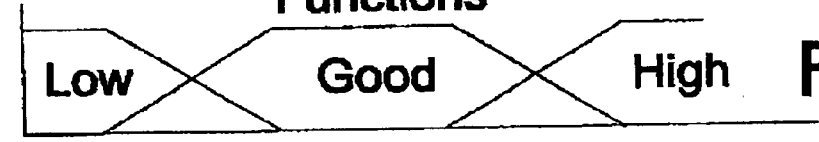
FIG. 10 details the operation of the slope input membership functions.

Module 620 in FIG. 6 illustrates the slope input membership functions, generally. Details of these functions are shown in FIG. 10. These functions work directly on the signal value, $y_i$, itself. If the slope $y_i$ is between 60 and 120 degrees, the slope is a 100 percent member of the "Good"

set. As the slope changes from 60 to 45 degrees and from 120 to 135 degrees, the slope is increasingly bad (either too low, or too high). Any slope below 45 degrees or above 135 degrees is 100 percent bad.

Figure 12:
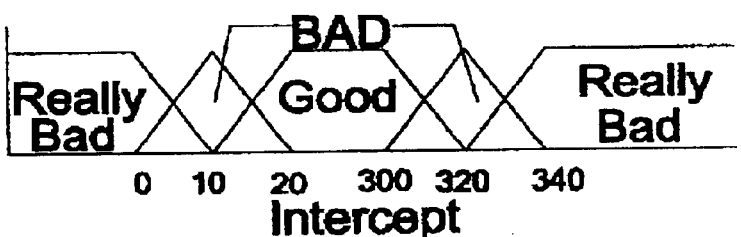

Module 622 in FIG. 6 illustrates the intercept input membership function which processes value "C" indicative of signal $x_i$ that is being evaluated. Details of the intercept input membership functions are shown in FIG. 12. The output of the intercept input membership function is a value indicative of the acceptability of the intercept signal value being evaluated for acceptability and invalidity. The intercept input membership function is shown in more detail in FIG. 12. Referring now to FIG. 12, any intercept having a value between 20 and 300 is considered 100 percent "Good". As the intercept value transitions between 20 and 10 and between 30 and 320, the intercept is considered increasingly bad and decreasingly good. As the intercept drops below 10 and increases above 320, the intercept signal value ($x_i$) is increasingly "Really Bad" and decreasingly "Bad".

Figure 11:
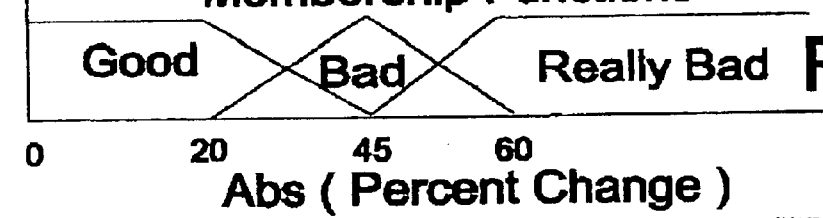
FIG. 11 details the operation of the percent change in intercept membership functions FIG. 12 details the operation of the intercept input membership functions.

Module 624 in FIG. 6 illustrates the fuzzy logic percent change intercept input membership functions. Details of these functions are shown in FIG. 11. These functions receive value "D", indicative of the variation or difference between the signal value being tested, $x_i$, and the historical signal value, $x_c$. The membership functions themselves are shown in more detail in FIG. 11. Referring now to FIG. 11, if the percent change in the intercept (i.e., the value D) is 20 or less, the intercept is considered to be 100 percent "Good". As the percent change in the intercept varies between 20 and 45 percent, the intercept is deemed to be increasingly "Bad" and less "Good". As a percent change intercept varies from 45 to 60 percent, the signal value, $x_i$, is deemed to be increasingly "Really Bad", and decreasingly "Bad".

Figure 13:
FIG. 13 details the operation of the output membership functions.

All the four modules of input membership functions are defuzzified and reduced to a single value, preferably using the center-of-gravity technique, and are then used as inputs to the output membership function shown in module 626. This membership function is shown in more detail in FIG. 13. The output membership function combines all of the input membership functions and outputs a single value that is then thresholded at block 628 to provide an acceptable/unacceptable determination. The particular thesholding value will depend upon the particular components selected. In this manner, the slope and intercept sensor signals $y_i$ and $x_i$ are either determined to be acceptable or not acceptable, to be valid or invalid. As explained above, if they are acceptable, they become the new $y_c$ and $x_c$ used when the next image is processed, and they are also used to guide the vehicle. If they are not acceptable or valid, they are thrown out, and the old $y_c$ and $x_c$ are unchanged and are used again in the next iteration of the quality analysis of the next image that is processed.

What is claimed is:

1. A method of processing a sensor signal indicative of an environmental condition comprising the steps of:
   receiving an electrical sensor signal indicative of an environmental condition;
   deriving from the sensor signal at least one numeric sensor signal value characteristic of an environmental condition;
   processing the sensor signal with a plurality of fuzzy logic input membership functions;
   combining the outputs of the plurality of fuzzy logic membership functions in at least one fuzzy logic output membership function;
   defuzzifying the output of the at least one output membership function to determine whether or not the signal is acceptable or not.

2. The method of claim 1, wherein the sensor signal is a plurality of numeric values indicative of an electronic camera image.

3. The method of claim 2, wherein the at least one numeric sensor value is indicative of the boundary between a cut portion and an uncut portion of an agricultural field, and further wherein the step of deriving includes the step of analyzing the camera image to reduce the plurality of numeric values to the at least one numeric sensor signal value.

4. The method of claim 1, wherein the step of processing the sensor signal includes the steps of:
   processing a first of the plurality of numeric sensor values with a first of the plurality of fuzzy logic input membership functions, wherein the first input membership function is indicative of the acceptability/unacceptability of the first numeric sensor value;
   processing a second of the plurality of numeric sensor values with the second of the plurality of fuzzy logic membership functions, wherein the second input membership function is indicative of the acceptability/unacceptability of the second numeric sensor value.

5. The method of claim 4, wherein the step of combining the outputs includes the step of combining the outputs of the first and second membership functions in at least one fuzzy logic output membership function.

6. The method of claim 4, wherein the first numeric sensor value is derived from a first electronic image.

7. The method of claim 6, wherein the second numeric sensor value is derived from the first electronic image.

8. A method of processing a sequence of electronic camera images using fuzzy logic comprising the steps of:
   taking a first electronic camera image indicative of a scene including cut and uncut vegetation in an agricultural field by an electronic camera;
   deriving from the first image a first numeric value indicative of a first characteristic of the first image;
   processing the first numeric value with at lest a first fuzzy logic input membership function to provide a first numeric input value;
   combining the first numeric input value with at least a first fuzzy logic output membership function to provide a first numeric output value;
   defuzzifying the first numeric output value to determine whether or not the first numeric value properly characterizes the first image or not; and
   saving the first numeric value.

9. The method of claim 8, further comprising the steps of:
   deriving from the first image a second numeric value indicative of a second characteristic of the first image;
   processing the second numeric value with at least a second fuzzy logic input membership function to provide a second numeric input value.

10. The method of claim 9, wherein the first and second characteristics are both indicative of a boundary line defined between a cut and an uncut region of the field.

11. The method of claim 9, wherein the first and second characteristics are indicative of a row of uncut crop.

12. The method of claim 9, wherein the first and second characteristics define a line substantially parallel to a row of uncut crop.

13. The method of claim 9, wherein the step of combining includes the step of combining first numeric input value and the second numeric input value with the at least a first fuzzy logic output membership function to provide the first numeric output value.

14. The method of claim 8, wherein the step of Defuzzifying the first numeric input value includes the step of determining that the first numeric value is acceptable, the method further comprising the steps of:

modifying the first fuzzy logic input membership function with the acceptable first numeric input value;

taking a second electronic camera image indicative of a scene including cut and uncut vegetation in an agricultural field by an electronic camera;

deriving from the second image a second numeric value indicative of the first characteristic of the first image;

processing the second numeric value with the previously modified at least a first fuzzy logic input membership function to provide a second numeric input value;

combining the second numeric input value with the at least first fuzzy logic output membership function to provide a second numeric output value;

defuzzifying the second numeric output value to determine whether or not the second numeric value properly characterizes the first image or not.

15. The method of claim 14, wherein the step of modifying the first fuzzy logic input membership function includes the step of changing the x-axis of the membership function based upon the value of the acceptable first numeric output value.

16. The method of claim 14, wherein the step of modifying the first fuzzy logic input function includes the step of combining the first numeric output value and the second numeric output value to provide a third numeric output value indicative of the difference between the first and second numeric output values.

17. In a work vehicle including a ground engaging implement having a camera for taking successive electronic images of a portion of ground and/or vegetation in front of the vehicle, and a guidance control system responsive to successive images generated by the camera, a method for determining whether each of the successive images transmitted by the camera to the guidance system should be used to guide the vehicle, the method comprising the steps of:

taking successive images of the ground in front of the vehicle with the camera;

successively processing the images to provide, for one image at a time, a first numerical value indicative of a characteristic of the ground and/or vegetation in front of the vehicle with the guidance system, wherein the numerical value is indicative of a line of travel of the vehicle;

determining whether or not the first numerical value is acceptable using at least two fuzzy logic input functions;

combining the results of the at least two fuzzy logic input functions as inputs to a fuzzy logic output function;

based upon a numerical result generated by the fuzzy logic output functions, determining whether the first numerical value should be used to guide the vehicle.

18. The method of claim 17, wherein a first of the at least two fuzzy logic input functions varies in its output both when a previously calculated first numerical value from the processing of a previous image changes and when the first numerical value of the said processing of a previous image changes.

19. The method of claim 18, wherein the previously calculated first numerical value from the processing of a previous image was calculated by:

taking a previous image of the ground in front of the vehicle with the camera; and processing the previous image to provide the previously acceptable numerical value indicative of a characteristic of the ground and/or vegetation in front of the vehicle with the guidance system, wherein the previously acceptable numerical value is indicative of a line of travel of the vehicle;

determining whether or not the first numerical value is acceptable using the at least two fuzzy logic input functions;

combining the results of the at least two fuzzy logic input functions as inputs to a fuzzy logic output function;

determining if the previously calculated first numerical value should be used to guide the vehicle based upon a numerical result generated by the fuzzy logic output function.

20. The method of claim 18, wherein an output of a second of the at least two fuzzy logic input functions varies when the first numerical value changes.

21. The method of claim 20, further comprising the steps of:

processing the image to provide a second numerical value indicative of a characteristic of the ground and/or vegetation in front of the vehicle with the guidance system, wherein the second numerical value is indicative of a line of travel of the vehicle; and determining whether or not the second numerical value is acceptable using the at least two fuzzy logic input functions.

\* \* \* \* \*